(12) United States Patent
Wilkins et al.

(10) Patent No.: US 6,773,606 B2
(45) Date of Patent: *Aug. 10, 2004

(54) SYSTEM FOR STRAINING SEPTIC TANK EFFLUENT BEFORE DISCHARGE TO A DRAIN FIELD

(75) Inventors: Charles A. Wilkins, Ann Arbor, MI (US); James O. Stoneburner, Ann Arbor, MI (US)

(73) Assignee: Perfection Sprinkler Co., Ann Arbor, MI (US)

( * ) Notice: Subject to any disclaimer, the term of this patent is extended or adjusted under 35 U.S.C. 154(b) by 217 days.

This patent is subject to a terminal disclaimer.

(21) Appl. No.: 09/921,208

(22) Filed: Aug. 3, 2001

(65) Prior Publication Data

US 2003/0085182 A1 May 8, 2003

Related U.S. Application Data

(60) Provisional application No. 60/239,537, filed on Oct. 10, 2000.

(51) Int. Cl.[7] .............................................. B01D 29/68
(52) U.S. Cl. ...................... 210/747; 210/798; 210/806; 210/170; 210/256; 210/299; 210/411; 210/532.2
(58) Field of Search ................................ 210/747, 798, 210/800, 805, 806, 170, 256, 258, 259, 299, 391, 402, 411, 413, 415, 416.1, 532.2

(56) References Cited

U.S. PATENT DOCUMENTS

| | | | | |
|---|---|---|---|---|
| 2,552,493 A | * | 5/1951 | Newton | 210/411 |
| 4,439,323 A | * | 3/1984 | Ball | 210/532.2 |
| 4,822,486 A | * | 4/1989 | Wilkins et al. | 210/416.1 |
| 5,215,656 A | * | 6/1993 | Stoneburner | 210/416.1 |
| 5,492,635 A | * | 2/1996 | Ball | 210/532.2 |
| 5,531,894 A | * | 7/1996 | Ball et al. | 210/800 |
| 5,635,064 A | * | 6/1997 | Bovington | 210/532.2 |
| 5,690,824 A | * | 11/1997 | Stuth | 210/532.2 |
| 5,720,875 A | * | 2/1998 | Stegall, Sr. et al. | 210/532.2 |
| 5,904,847 A | * | 5/1999 | Bovington | 210/532.2 |
| 5,910,249 A | * | 6/1999 | Kopp et al. | 210/416.1 |
| 5,985,139 A | * | 11/1999 | Zoeller | 210/532.2 |
| 6,231,764 B1 | * | 5/2001 | Wilkins | 210/532.2 |
| 6,261,452 B1 | * | 7/2001 | Mayer | 210/416.1 |
| 6,416,664 B1 | * | 7/2002 | Bovington | 210/532.2 |
| 6,508,933 B2 | * | 1/2003 | Wilkins et al. | 210/416.1 |

* cited by examiner

Primary Examiner—Christopher Upton
(74) Attorney, Agent, or Firm—George L. Boller

(57) ABSTRACT

A system for limiting the size of particulate matter entering a septic tank pump contains a strainer that has a straining screen through which the pump draws liquid from the septic tank. A nozzle receives some of the effluent being pumped by the pump and is aimed toward the screen for directing effluent toward the screen to dislodge particulate matter from an area of the screen while the pump draws liquid through the screen. The screen and nozzle are arranged for relative movement so that the area of the screen being acted on by the effluent from the nozzle changes as the pump operates. Various embodiments are disclosed.

15 Claims, 12 Drawing Sheets

SYSTEM FOR STRAINING SEPTIC TANK EFFLUENT BEFORE DISCHARGE TO A DRAIN FIELD

REFERENCE TO RELATED APPLICATION AND PRIORITY CLAIM

This application expressly claims the benefit of earlier filing date and right of priority from the following patent application: U.S. Provisional Application Ser. No. 60/239,537 filed on Oct. 10, 2000 in the names of Charles A. Wilkins and James O. Stoneburner. The entirety of that earlier-filed, co-pending patent application is hereby expressly incorporated herein by reference.

FIELD OF THE INVENTION

This invention relates generally to treatment of septic tank effluent before it is discharged to a drain field, and more particularly it relates to systems and apparatus for straining the effluent.

BACKGROUND OF THE INVENTION

Certain wastes introduced into a septic tank tend to separate into distinct layers: a bottom sludge layer, a top scum layer, and a noticeably distinct intermediate liquid layer that is to a large extent free of scum and sludge. As waste accumulates, liquid is periodically pumped out of the tank as effluent that is discharged to a drain field. An electric-operated pump is typically used for pumping, and it is desirable to communicate the suction inlet of the pump to the intermediate layer because that layer is generally freer of solids and particulate matter than are the scum and sludge layers.

To avoid the entry of undesired particulate matter into the pump, a stationary screen may be used to screen the liquid before it enters the pump. The particle size that can be effectively strained is determined by the screen mesh. Generally speaking, the finer the mesh, the smaller the particle that can be screened; however, the finer the mesh, the greater the tendency for the screen to clog. Actual screen mesh size may be a compromise based on conflicting factors. Because a screen is typically disposed within a tank or within a vault that is disposed within a tank, it may be inconvenient to regularly clean. Because a homeowner may not maintain a septic tank at the intervals recommended by a manufacturer, a manufacturer may decide that the mesh of a strainer screen may be deliberately sized more coarsely to guard against clogging due to lack of homeowner maintenance. This means that larger particulate material may enter the pump, and while this may be undesirable as far as the pump is concerned, it may be deemed preferable to the risk of screen clogging.

Commonly assigned U.S. Pat. No. 6,231,764 of Charles A. Wilkins discloses a pump arrangement, including a self-cleaning rotary strainer that is effective in straining liquid that is pumped out of a septic tank as effluent to a drain field.

The exemplary pump arrangement disclosed in that patent comprises an electric-motor-operated effluent pump disposed generally upright, and coaxially within, an upright main tube that extends downward from a top wall of a septic tank to a location at or near a bottom wall of the tank. The tube passes through the top scum layer, through the intermediate liquid layer, and into the bottom sludge layer. Sensors, or switches, that sense the level of waste in the tank control operation of the pump. When the level rises beyond an upper limit, the pump operates to pump fluid out of the tank until the level drops to a lower limit at which the pump shuts off.

A strainer strains liquid entering the main upright tube from the intermediate layer, and includes a cylindrical filter screen disposed coaxial with the tube to constrain the effluent to flow radially through the filter screen and into the interior of the strainer. An electric pump unit is disposed coaxially within the tube and comprises an inlet port which is disposed downstream of the strainer along the direction of effluent flow through the system. The effluent provides some cooling of the motor as it flows along the motor exterior toward the inlet port where it enters the pump unit. An outlet pipe that is communicated to an outlet port at which pumped effluent exits the pump unit conveys pumped effluent out of the septic tank.

A nozzle is communicated to the pump unit outlet port and arranged to emit some of the pumped effluent toward the cylindrical filter screen opposite the effluent flow through the filter screen so as to cause the filter screen to be acted upon by both radial and circumferential flow components. A journal mounts one of the screen and the nozzle for rotation relative to the other such that effluent emitted from the nozzle is effective both to turn the screen and nozzle relative to each other and to dislodge debris from the filter screen.

In some embodiments, the nozzle is disposed within the interior of the strainer and arranged to emit effluent in a radially outward direction, and the flow of effluent through the filter screen is radially inward toward the interior of the strainer. In others, the nozzle is disposed in the exterior of the strainer and arranged to direct effluent radially inward toward the interior of the strainer, and the flow of effluent through the filter screen is radially outward toward the exterior of the strainer.

It is believed that the self-cleaning action enables the screen to have a finer mesh, yet avoid clogging, when the septic system is used in compliance with manufacturer recommendations. In a septic system where strainer clogging may be a limiting factor, the system disclosed in the Wilkins patent can offer the potential for extending the length of time between maintenance intervals.

SUMMARY OF THE INVENTION

The present invention relates to further improvements in self-cleaning septic tank strainers. Various embodiments of improvements are disclosed, and each possesses certain unique features within generic aspects of the present invention. The strainers use materials that are suited to provide long service life, but when needed, service may be conveniently accomplished. The inventive strainers are adapted for retrofitting existing septic systems, as well as for installation as original equipment in new septic systems.

Moreover, various embodiments make the inventive strainer suitable for use in various types of septic systems. Certain embodiments are suited for use with electric-motor-operated effluent pumps of the type described at length above with reference to the Wilkins patent. Certain embodiments are suited for use with other types of septic tank pumps that comprise electric-operated pumps housed within pump vaults that are disposed within septic tanks. Certain embodiments are intended for integrated assembly with a pump to form a pump/strainer unit that can be installed within a septic tank. Certain embodiments can provide for the strainer to be remotely located from the pump. Strainers that embody principles of the invention can be used in single and multiple septic tank systems.

A general aspect of the invention relates to a system for straining liquid pumped as effluent from a septic tank to a drain field. The apparatus comprises a strainer for straining liquid that is being pumped out of a septic tank by a pump before the liquid enters the pump. The strainer comprises a straining screen through which the pump draws the liquid. Solid material that is sucked against a face of the screen by pump suction is dislodged from the screen by returning some of the pumped effluent to a nozzle that is aimed toward the screen. The effluent emitted from the nozzle can act on a limited area of the screen while liquid is drawn through the remaining screen area. The screen and nozzle move relative to one another so that the area of the screen being acted on by the effluent from the nozzle is continually changing. This relative motion eventually enables the full extent of the screen to be cleaned, with the cleaning being repeated as long as the pump continues to operate.

The various embodiment of the invention provide for different types of relative motion and different screen and nozzle geometries. The nozzle may be stationary while the screen moves, or alternatively the screen may be stationary while the nozzle moves. The nozzle may execute either rotary motion or oscillatory motion. The screen may have a circular annular shape that extends 360° about an axis. The screen may be mounted on a wall in covering relation to a hole in the wall, and as such may be either flat or curved.

Because a septic tank that comprises a self-cleaning strainer embodying principles of the present invention allows the screen to have a finer mesh, yet avoid clogging, any particles that pass through the screen will have a smaller size. The pump is therefore not taxed by larger size particles, there is less likelihood that the nozzle or nozzles that clean the screen will clog. Because the inventive strainer prevents larger particles from being pumped out of the tank with the effluent, it may also be helpful in extending the useful life of a drain field.

The foregoing features, advantages, and benefits of the invention, along with additional ones, will be seen in the ensuing description and claims, which are accompanied by drawings. The drawings disclose a presently preferred embodiment of the invention according to the best mode contemplated at this time for carrying out the invention.

DETAILED DESCRIPTION OF THE PREFERRED EMBODIMENTS

Figure 1:
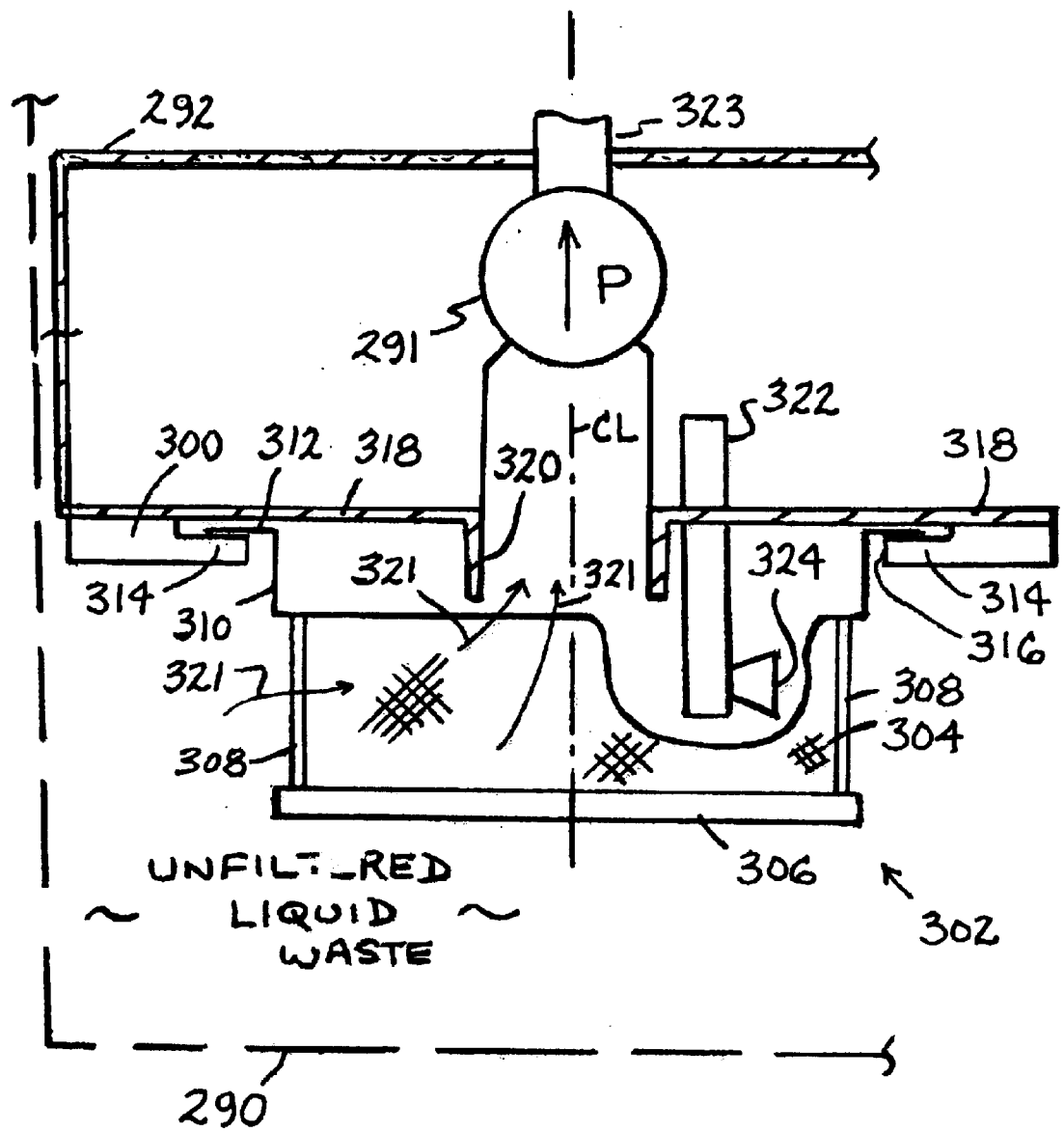
FIG. 1 shows an elevation view, partly broken away, of a first embodiment in accordance with principles of the present invention.

FIG. 1 shows a self-cleaning septic tank strainer 302. The strainer may be associated with a pump in any of several different ways. One way is to dispose strainer 302 in underlying relation to the bottom horizontal wall 300 of a pump vault 292 so that both pump vault 292 and strainer form a unit that is supported within a septic tank 290 in any suitable manner. Preferably the unit is supported such that strainer 302 is disposed in the intermediate zone of the septic tank. Pump vault 292 contains a pump, shown schematically at 291, that when running, is effective to draw liquid through strainer 302.

Strainer 302 comprises a circular perforated screen 304 supported uprightly on the outer margin of an imperforate horizontal circular bottom wall 306. The screen is retained in a circular shape by uprights, or posts, 308. The upper ends of posts 308 join to an imperforate rim 310 that is stepped to provide an outwardly directed horizontal flange 312 that is supported on a circular ledge 314 forming the margin of a circular hole 316 in wall 300. Flange 312 is captured on ledge 314 by an overlying wall 318 which has a flanged circular hole 320 at its center and is formed as part of bottom wall 300 as shown. When the pump is drawing liquid through the strainer, the liquid flows in the direction of the arrows 321, passing through screen 304 and thence upward through hole 320 to the pump inlet. The pump pumps the liquid as effluent through a discharge pipe 323 ultimately leading to a drain field.

Adjacent hole 320, a supply pipe 322, that is teed into discharge pipe 323 through which the pump pumps effluent, extends through wall 318 to terminate in one or more nozzles 324 facing the interior side of the circular screen 304. Supply pipe 322 conveys some of the pumped effluent to the nozzle(s). The nozzle(s) are arranged at a suitable angle not only to clean the screen but also to impart a horizontal force that is effective to rotate strainer 302 about a vertical centerline CL that is shared by the strainer, the screen, flange 312, and hole 320. In this way the screen rotates past the nozzle(s) where it will be continuously cleaned by the nozzle(s) to dislodge accumulated debris from the exterior side of the screen. Because a limited circumferential extent of the screen is being cleaned at any given time, liquid can be drawn through the remainder of the screen to be pumped as effluent. Joints of the upper and lower edges of the circular screen are tight to the bottom wall and the rim so that debris will not be sucked through the joints. Flange 312 has close running clearance to the crevice within which it is captured between walls 300 and 312.

Alternatively, wall 300 can be a separate wall that is disposed against the bottom wall of a pump vault with hole 320 positioned in registration with a suction inlet of the pump extending through the vault bottom wall.

Another way to associate strainer 302 with a pump is like the way described in commonly assigned U.S. Pat. No. 6,231,764 where wall 300 is disposed within the interior of a cylindrical vault tube. Suitable modification is made to the strainer so that it will fit to the axial flow type pump shown in that patent.

Figure 2:
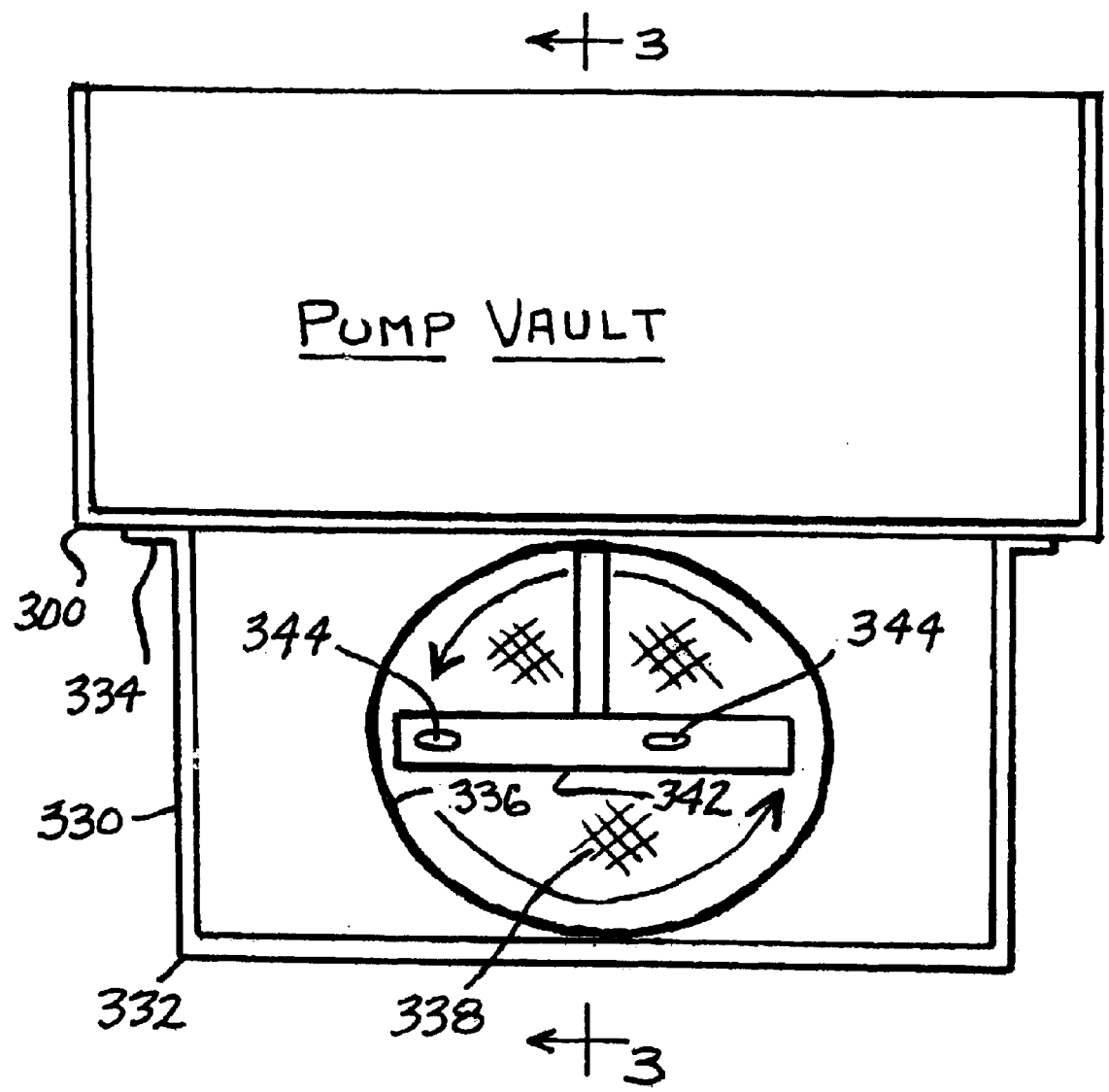
FIG. 2 shows an elevation view of a second embodiment.
Figure 3:
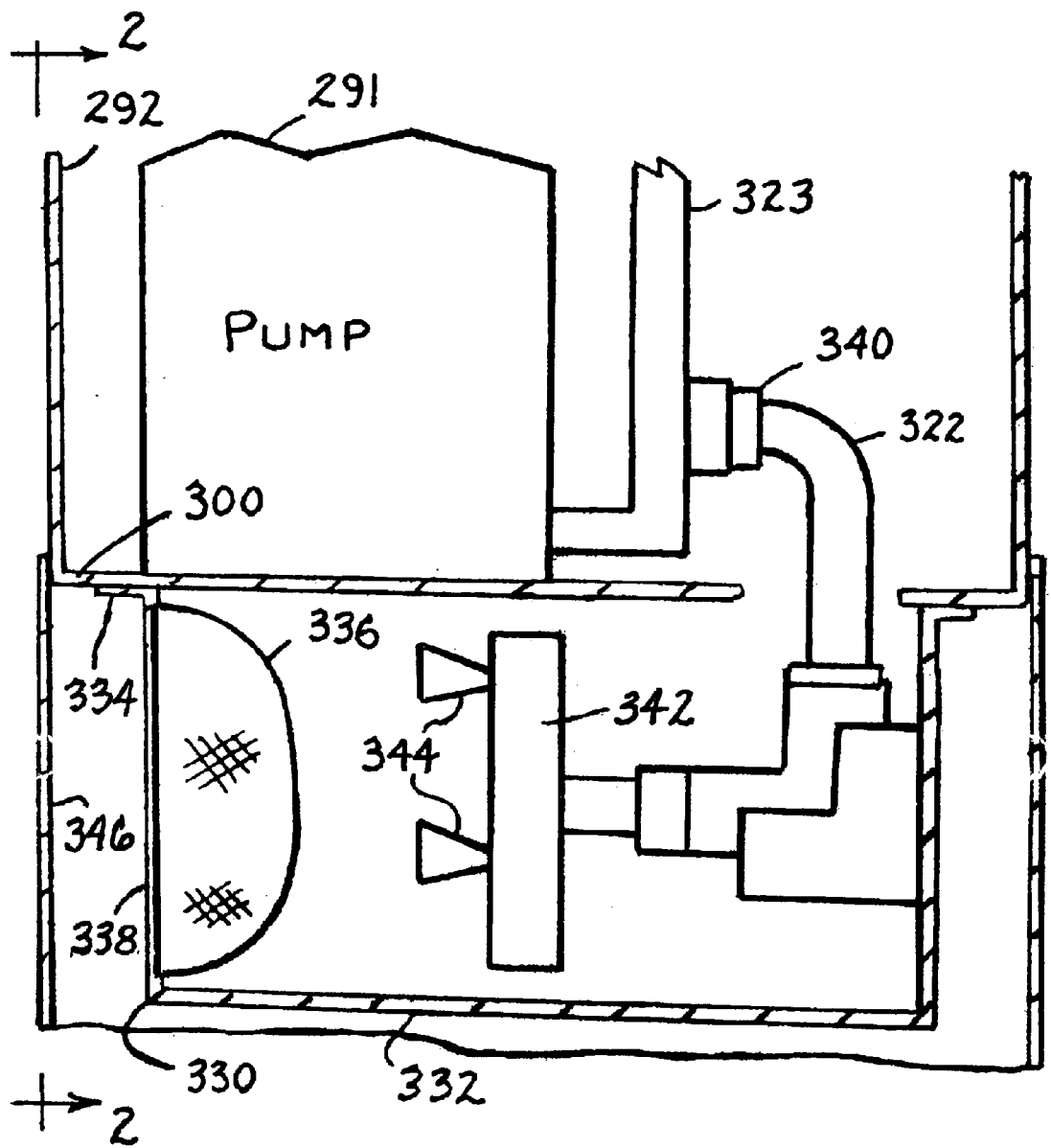
FIG. 3 is a vertical cross section view in the direction of arrows 3—3 in FIG. 2.

FIGS. 2 and 3 illustrate a second embodiment of strainer 330 that comprises a circular imperforate cup 332 having an open upper rim 334 that is fit tight to wall 300 to prevent debris intrusion between them. The side wall of the cup comprises a circular hole 336 that is covered by a perforated screen 338 having a tight fit of the screen edge to the margin of the hole to prevent debris intrusion between them. Wall 300 forms the bottom of the pump vault 292 containing pump 291 that draws liquid through the screen to pump out the septic tank. A tap 340 at the pump outlet returns some of the pumped effluent through supply pipe 322 for cleaning the screen.

A rotary spray arm 342 is mounted within the interior of cup 332, and contains one or more nozzles 344 aimed at the interior side of screen 338. The liquid pressure delivered to spray arm 342 is effective to cause it to rotate about a horizontal axis that intersects the center of the screen as sprays are also being emitted from its nozzles. Because the nozzles spray only a limited area of the screen at any given instant of time to dislodge debris from the exterior of the screen, the remainder of the screen remains open so that the pump can draw liquid through it. It is believed beneficial to place a wall 346 over the screen in relatively close outwardly spaced relation to limit the influence of the nozzle spray on the unfiltered waste.

The second embodiment can be modified to an embodiment (not shown by a drawing) wherein such a rotary spray arm is mounted above the level of wall 300 to emit spray toward an existing screen in the side wall of a tube mounted within the vault within which the pump is disposed.

Figure 4:
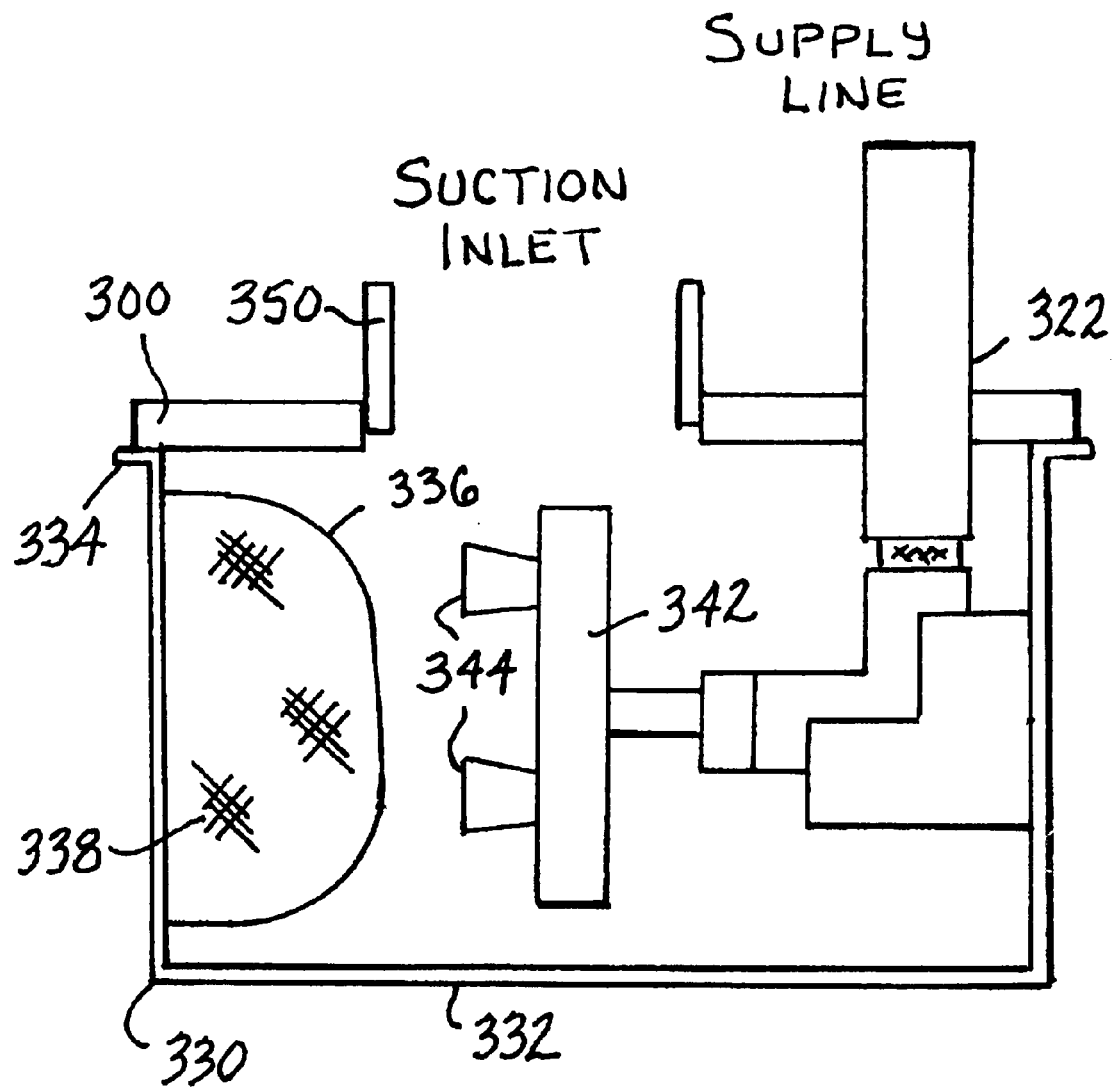
FIG. 4 is a view similar to FIG. 3, showing a modification.

FIG. 4 shows an embodiment that has a strainer like the one of FIGS. 2 and 3. It differs in that it allows the pump to be remotely located with the suction inlet of the pump being coupled to the strainer interior by a suction tube 350.

Figure 5:
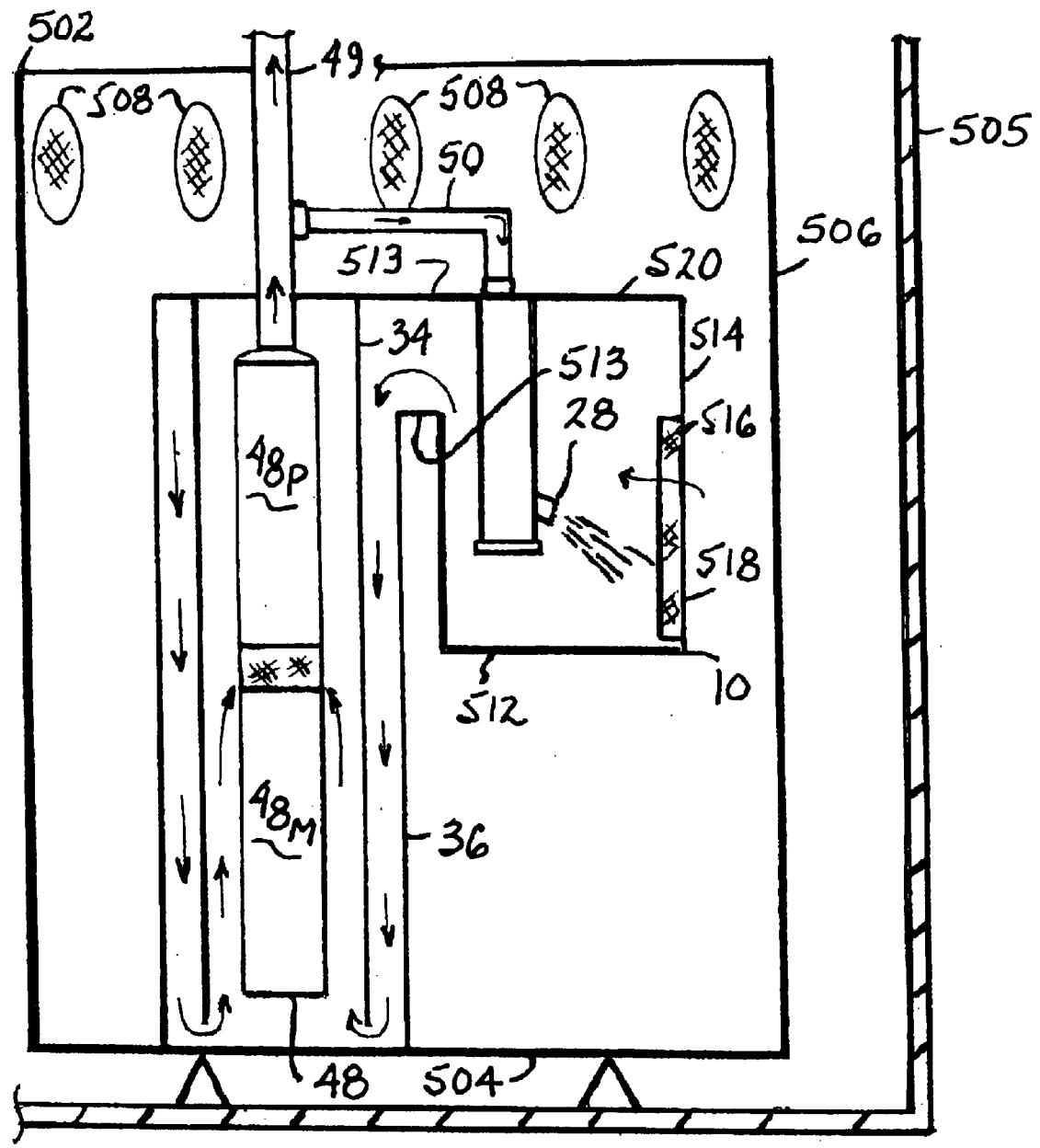
FIG. 5 is a vertical cross section view through another embodiment.

FIG. 5 shows another embodiment where a pump/strainer unit 500 is disposed within a vault 502 having a closed bottom wall 504 and a side wall 506. Unit 500 is supported in any suitable manner within vault 502, such as being supported upright on bottom wall 504. Vault 502 is itself supported in any suitable manner within the interior of a septic tank 505. Side wall 506 extends vertically upward from bottom wall 504 to bound the vault interior. Side wall 506 is closed except for being open at the top and having a series of holes 508 spaced in succession around the side wall circumference shortly below the open top of the vault. Liquid in septic tank 505 that is above the level of holes 508 spills into the interior of vault 502 where pump/strainer unit 500 is disposed. In use, the interior of vault 502 will typically be completely filled with liquid so that pump/strainer unit 500 is completely immersed in liquid.

Unit 500 comprises an electric pump like one shown in commonly assigned U.S. Pat. No. 6,231,764. A pump/motor sleeve 34 is disposed upright coaxial with and within the interior of a support tube 36 of larger diameter. Both sleeve 34 and tube 36 can be commercial PVC pipe. Tube 36 is closed at the bottom, either by a sealed fit to bottom wall 504 of the vault (as shown), or by a closure (not shown) that is fit to the lower end of the tube in a fully sealed manner. Sleeve 34 and tube 36 are associated by any suitable construction that keeps the lower end of the sleeve open.

Pump/strainer unit 500 comprises a strainer 10 having a walled enclosure 512 that is fit to, and closes, the upper end of support tube 36. Enclosure 512 has an interior that serves to communicate support tube 36 to the interior of vault 502. Enclosure 512 comprises a vertical side wall 514 containing a hole 516 covered by a mesh screen 518.

An electric pump unit 48 comprising an electric motor 48$m$ and a pump 48$p$ driven by the motor is disposed coaxially within sleeve 34. When unit 48 operates, it draws liquid in vault 502 through strainer 10. The flow path through unit 500 is shown by the arrows. Liquid is strained by screen 518 as it enters the interior of enclosure 512 at hole 516. It passes through the interior to enter support tube 36, thence downwardly through the annular space between sleeve 34 and tube 36, and thence around the lower edge of sleeve 34 where it enters the sleeve. The liquid then flows upward through the sleeve to enter the pump, which will pump the liquid out as effluent through a discharge conduit, or pipe, 49 extending from the pump discharge outlet. As the liquid passes along the exterior of motor 48$m$, heat from the motor can transfer to the liquid whereby the liquid provides motor cooling. As the unit is being operated, liquid under pressure is being delivered to a spray nozzle 28 through a supply pipe 50 to clean screen 518. Because the pumped effluent has been strained by strainer 10, it may be used to supply spray nozzle 28 by teeing pipe 50 into conduit 49. The upper end of sleeve 34 is closed to the top horizontal wall 520 of enclosure 512, and both conduit 49 and pipe 50 pass through, and are sealed to, holes in that wall. Thus, within the liquid in vault 502, unit 500 is totally enclosed except for the opening to the interior of enclosure 512 through screen 518.

The liquid drawn from the interior of enclosure 512 is continually replenished by flow through screen 518. Screen 518 strains the liquid that enters enclosure 512 so that particulate and other material larger than a certain size is prevented from entering the enclosure. In this way the liquid is strained before it ever reaches the pump.

Spray nozzle 28 comprises a spray mechanism like that of U.S. Pat. No. 5,058,806, hereby incorporated by reference. That mechanism is effective to create a spray that is directed outwardly against the inside of screen 518 to dislodge adhering debris from the outside of the screen. The spray washes only a limited area of screen 518 at any given time, but it moves across the screen to eventually wash the entire screen area. The spray motion may be rotary or oscillatory. The screen may be flat or curved. Because a limited zone of the screen is being cleaned at any given time, liquid can be drawn through the remainder of the screen by the pump.

In a specific embodiment, enclosure 512 comprises an upright cylindrical tube that is closed at both top and bottom. Tube 36 is also closed at both ends. A short horizontal tube 513 extends between confronting portions of the side walls of the two vertical tubes just below the closed upper ends of the two tubes. Tube 513 serves to communicate the interior of the tube forming enclosure 512 to the interior of tube 36.

Figure 6:
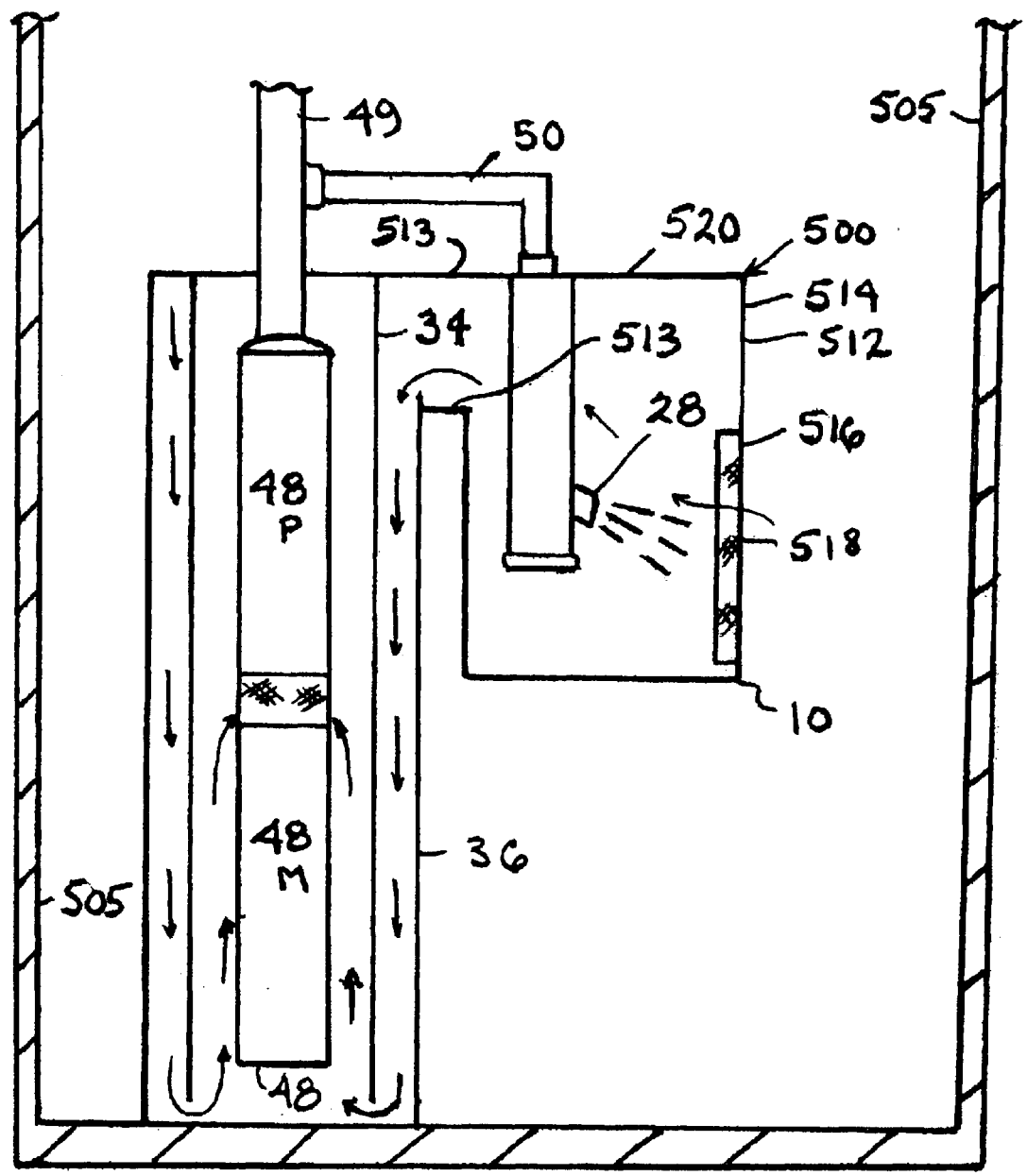
FIG. 6 is a vertical cross section view through another embodiment similar to FIG. 5.

FIG. 6 shows an embodiment that is like that of FIG. 5 except that vault 502 is not used, and pump/strainer unit 500 is instead disposed directly within septic tank 505. Like elements in both FIGS. 5 and 6 are identified by the same reference numerals, and so a detailed description of unit 500 will not be repeated in connection with FIG. 6. When unit 500 is placed directly within septic tank 505 without vault 502, it is preferable to locate screen 518 in the intermediate zone of liquid in the tank. When vault 502 is used, the vault aids in preventing larger material suspended in liquid from entering the vault.

Figure 7:
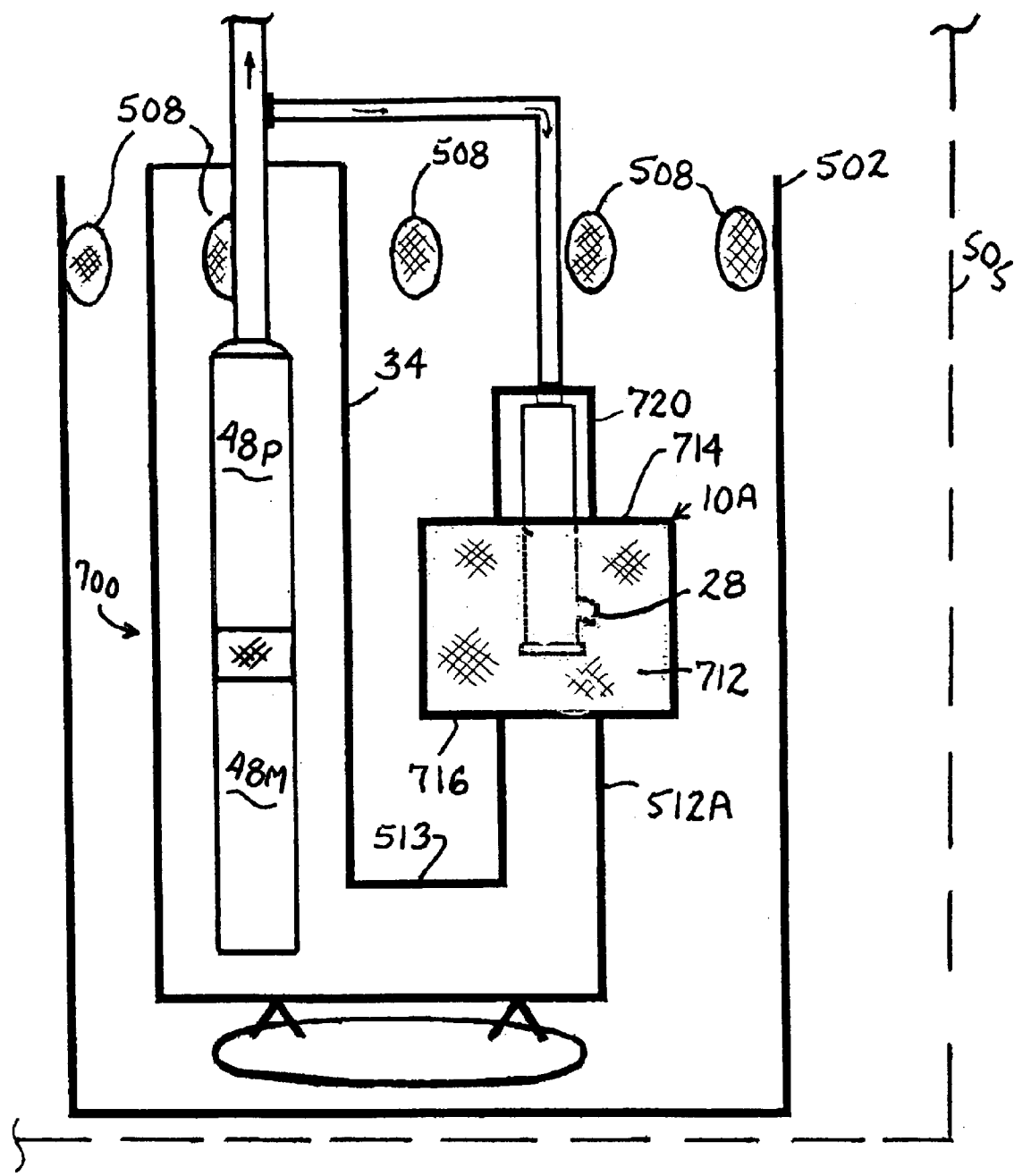
FIG. 7 is a vertical cross section view through still another embodiment.

FIG. 7 shows another embodiment of pump/strainer unit 700 that is disposed within a vault 502 like the one of FIG. 5. Vault 502 is in turn disposed within a septic tank 505. Unit 700 comprises a pump like the one described in connection with FIG. 5, but does not use a tube 36 because the associated self-cleaning strainer 10A communicates to the bottom of sleeve 34. Sleeve 34 is still disposed upright and is closed at the top so that liquid in the septic tank cannot enter that end.

Strainer 10A comprises a walled enclosure 512A having an interior for conveying strained liquid into the lower end of sleeve 34. At its upper end, the strainer comprises a mesh screen 712 that is cleaned by a spray nozzle 28 disposed interior of the screen. In a specific embodiment, enclosure 512A comprises an upright cylindrical tube that is closed at the bottom. A short horizontal tube 513A extends between confronting portions of the side wall of the tube forming enclosure 512A and the side wall of sleeve 34.

Nozzle 28 may. be like the one previously described, with either rotary or oscillatory motion of the spray across the screen. The screen may be flat or curved, and it may have a full or partial circumferential extent. FIG. 7 shows a specific example where screen 712 is circular with its upper and lower edges secured to the margins of circular walls 714, 716. Holes are present at the centers of walls 714, 716. The body of spray nozzle 28 passes through the hole in wall 714, and a cap 720 that supports nozzle 28 closes the hole. The hole in the center of wall 716 is fit to the upper end of the tube forming enclosure 512A. The spray emitted from nozzle 28 traverses screen 712 with circumferential motion.

Figure 8:
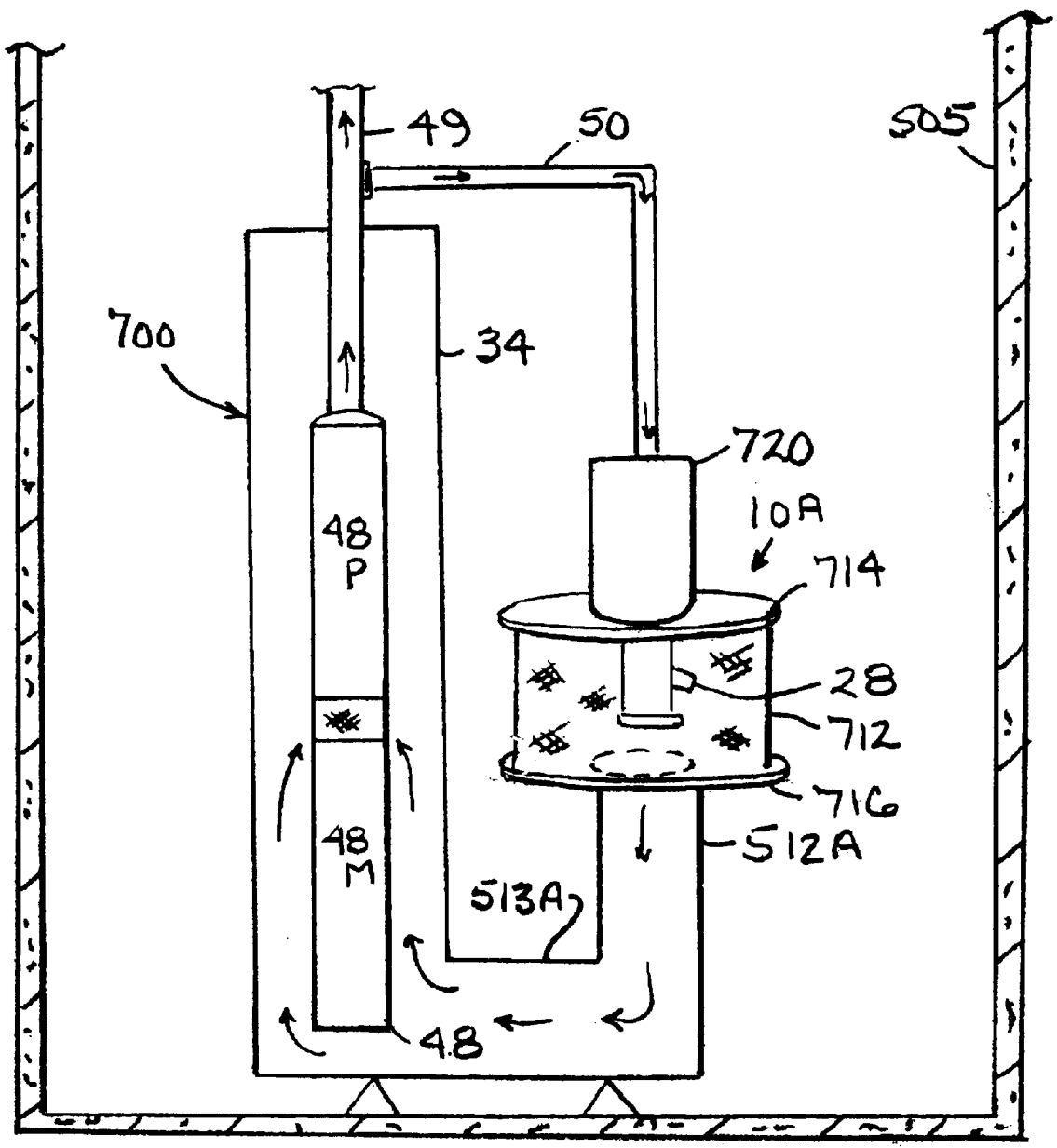
FIG. 8 is a vertical cross section view through still another embodiment similar to FIG. 7.

FIG. 8 shows an embodiment that is like that of FIG. 7 except that vault 502 is not used, and pump/strainer unit 700 is instead disposed directly within septic tank 505. Like elements in both FIGS. 7 and 8 are identified by the same reference numerals, and so a detailed description of unit 700 will not be repeated in connection with FIG. 8. When unit 700 is placed directly within septic tank 505 without vault 502, it is preferable to locate screen 712 in the intermediate zone of liquid in the tank.

Figure 8A:
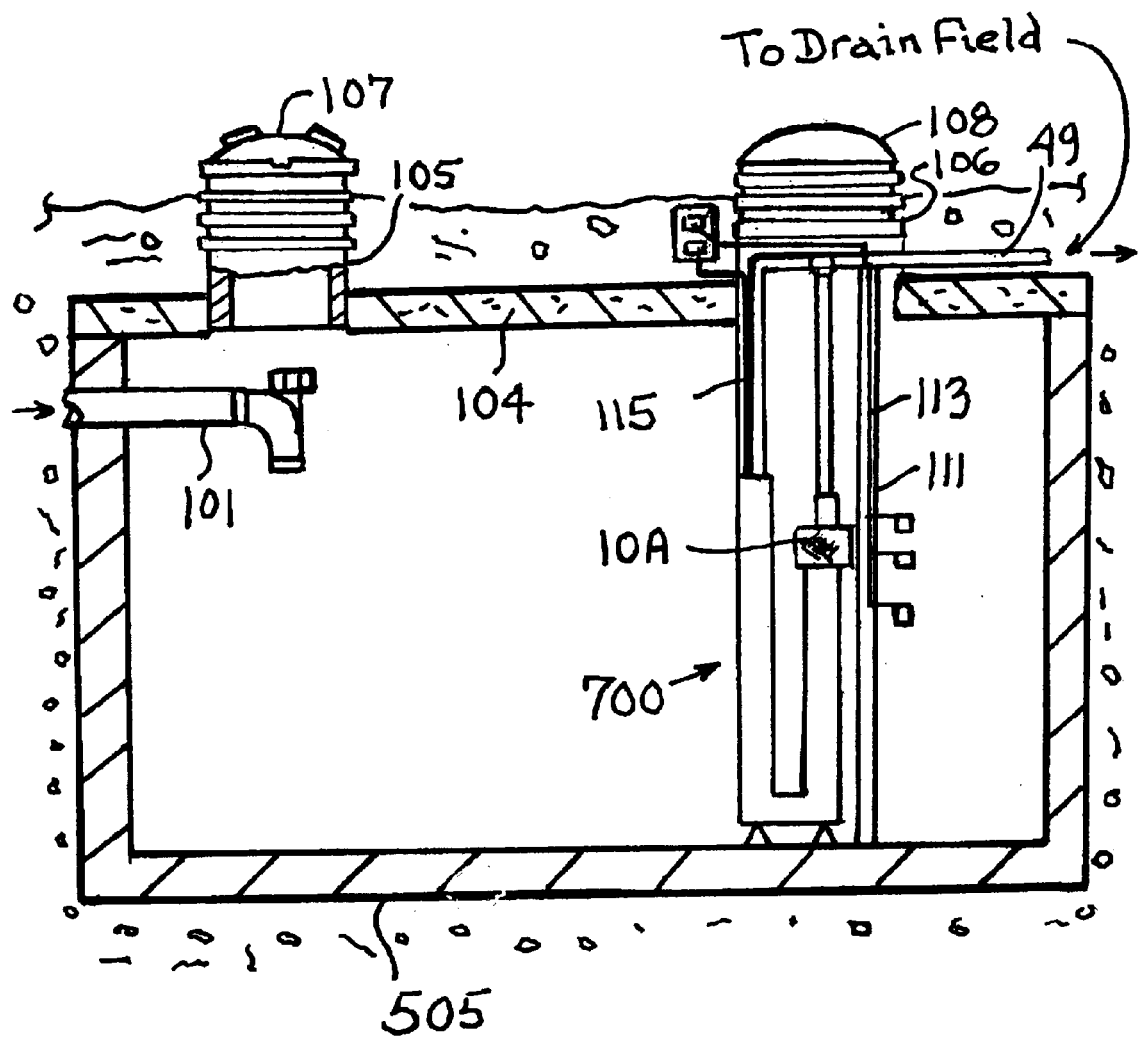
FIG. 8A is a vertical elevation view, in cross section, through an exemplary septic tank containing a pump-strainer unit according to principles of the invention.

FIG. 8A shows an example of a septic system that comprises an in-ground septic tank 505. Tank 505 encloses a rectangular volume into which liquid waste, such as household sewage, is introduced through an inlet pipe 101. A pump/strainer unit 700 is disposed within tank 505 for drawing liquid from the tank and pumping it out as effluent through a discharge pipe 49 to a drain field. The top of tank 505 is closed by a tank lid, or cover, 104 that contains two access risers 105, 106 extending upward to above ground level. The risers are cylindrical in shape and are closed at the top by removable caps 107, 108. When removed from the risers, caps 107, 108 allow access to inlet pipe 101 and to pump/strainer unit 700.

When a new septic tank is being installed, the tank can be set in an excavation with or without pump/strainer unit 700 installed. Before tank lid 104 is placed on the tank and the tank covered with fill, unit 700 can be easily placed into the tank because the top is fully open. After the unit has been placed, a pipe leading from the unit to the drain field can be connected to discharge pipe 49 in any appropriate manner. FIG. 8A shows such a pipe passing through the sidewall of riser 106, above lid 104, but below cap 108. The Figure also shows a float switch tree 111 as part of the unit. The tree may be supported upright from a stand that forms the base of the unit. The switches of the tree control the operation of the electric operated pump to pump out effluent when the level rises to a certain level in the tank and to then shut off the pump once the tank has been pumped out to below a certain level. The switches are at elevations intended to keep strainer 10A in the intermediate zone of liquid in the tank. FIG. 8 further shows electric connections 113, 115 to both the tree and the pump motor.

In an existing septic tank installation that has a pump, but lacks the self-cleaning strainer of the present invention, the tank is below ground, and so the only access for retrofitting the existing installation with a self-cleaning strainer 10A is via riser 106. The maximum lateral dimension of unit 700 allows it to pass through conventional risers that may have diameters as small as twenty inches. Hence, the inventive unit can retrofit, and be serviced when needed, via the existing riser.

Figure 9:
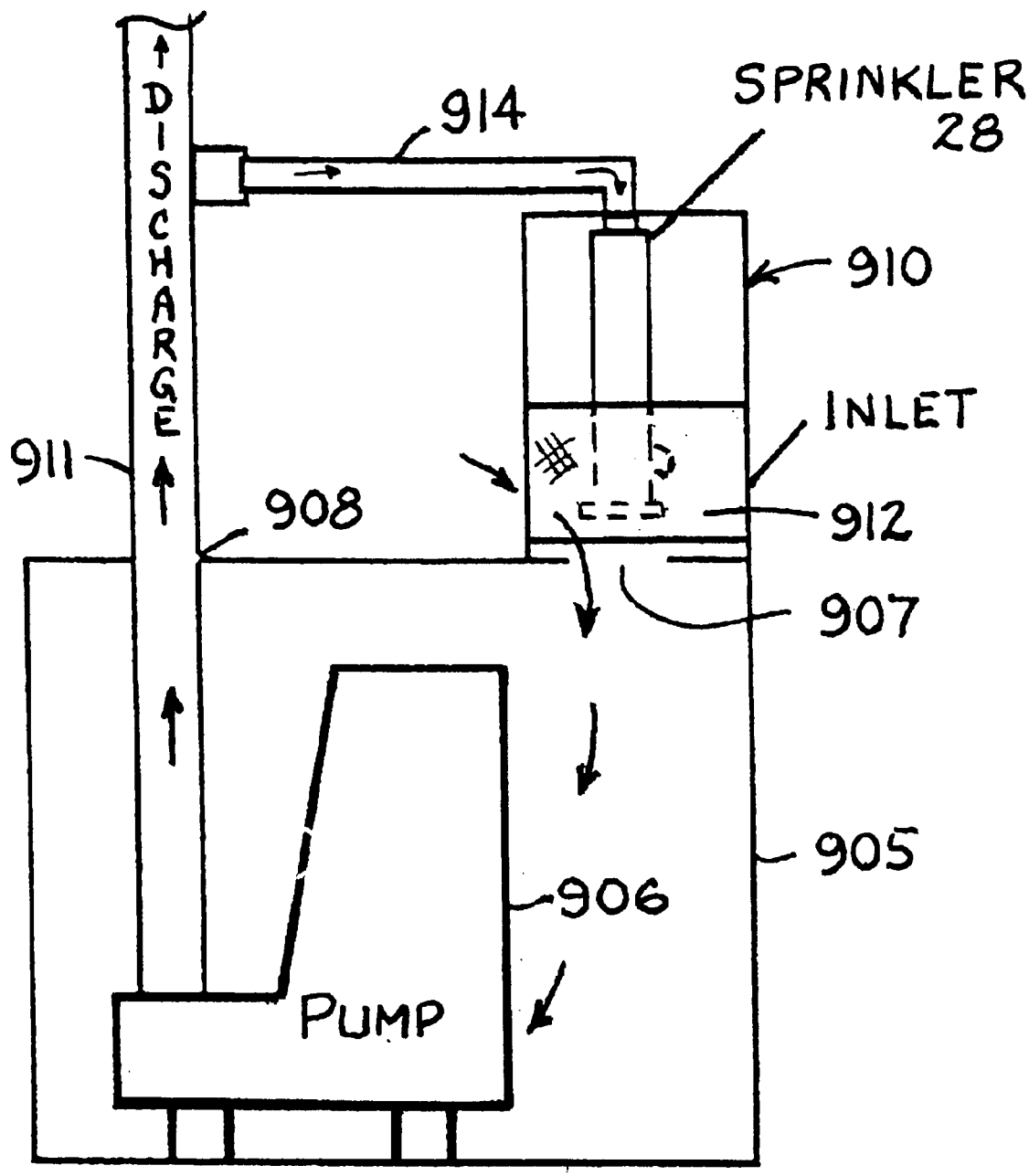
FIG. 9 is a vertical cross section view through still another embodiment.

FIG. 9 shows another embodiment where a strainer 910 is associated with a pump vault 905 containing a pump 906 to form a unit 900. Pump 906 may be a centrifugal type, electric operated pump. Although a septic tank is not shown, unit 900 is disposed in any suitable manner within the tank, such as simply resting on the bottom wall of the tank. Vault 905 comprises a walled enclosure that is closed except for having an entrance opening 907 and an exit opening 908 in a top horizontal wall of the vault. Strainer 910 is disposed in covering relation to entrance opening 907. Exit opening 908 provides for discharge pipe 911 to pass upward from the discharge outlet of pump 906 to transport pumped effluent out of the tank. A supply pipe 914 is teed into pipe 911 for returning some of the pumped effluent to a spray nozzle 28 that is disposed within the interior of strainer 910. Strainer 910 comprises a walled enclosure containing a screen 912. The screen may be flat or curved, and it may have a full or partial circumferential extent. Nozzle 28 may be like the one previously described, with either rotary or oscillatory motion of the spray across the screen. The walled enclosure of strainer 910 fits onto the top wall of vault 905 over entrance opening 907. The bottom of the walled enclosure is open to expose the enclosure interior to the interior of vault 905.

FIG. 9 shows a specific example where screen 912 is circular with its upper and lower edges secured to circular edges of the enclosure side wall. Supply pipe 914 passes through the otherwise closed top wall of the enclosure and spray nozzle is attached to and supported from the end of the supply pipe. The spray emitted from nozzle 28 traverses screen 912 with circumferential motion.

Figure 10:
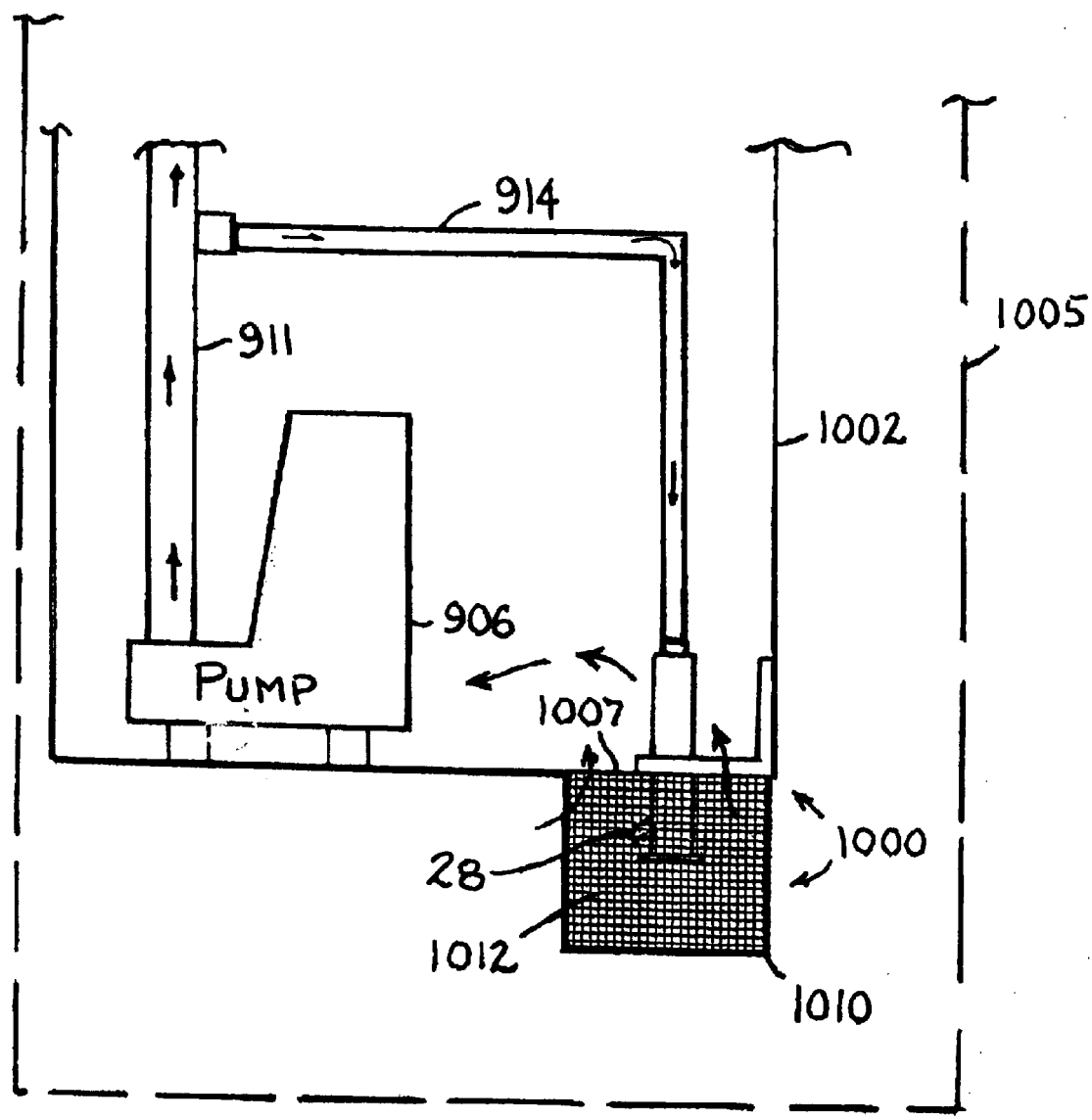
FIG. 10 is a vertical cross section view through still another embodiment.

FIG. 10 shows another embodiment of pump/strainer unit 1000 that is disposed within a vault 1002 that in turn is disposed within a septic tank 1005. Unit 1000 comprises a pump 906 and discharge pipe 911 like those described in connection with FIG. 9. A supply pipe 914 is teed into pipe 911 for returning some of the pumped effluent to a spray nozzle 28 that is disposed within the interior of a strainer 1010 that is associated with the pump and vault to form unit 1000. Strainer 1010 is disposed on the exterior of vault 1002 beneath the bottom horizontal wall of the vault in covering relation to entrance opening 1007 in the bottom wall of the vault. Supply pipe 914 passes through the interior of the vault and entrance opening 1007 to spray nozzle 28. Strainer 1010 comprises a screen 1012 that may be flat or curved, and that may have a full or partial circumferential extent. Nozzle 28 may be like the one previously described, with either rotary or oscillatory motion of the spray across the screen.

FIG. 10 shows a specific example where screen 1012 is circular with its upper edge configured in any suitable way to close against the bottom wall of the vault. The lower edge of the screen is fit to the margin of a circular wall of the strainer enclosure that closes the bottom of the strainer. The embodiment of FIG. 10 is intended to be suspended in a septic tank to place the strainer in the intermediate zone of liquid in the tank.

Figure 11:
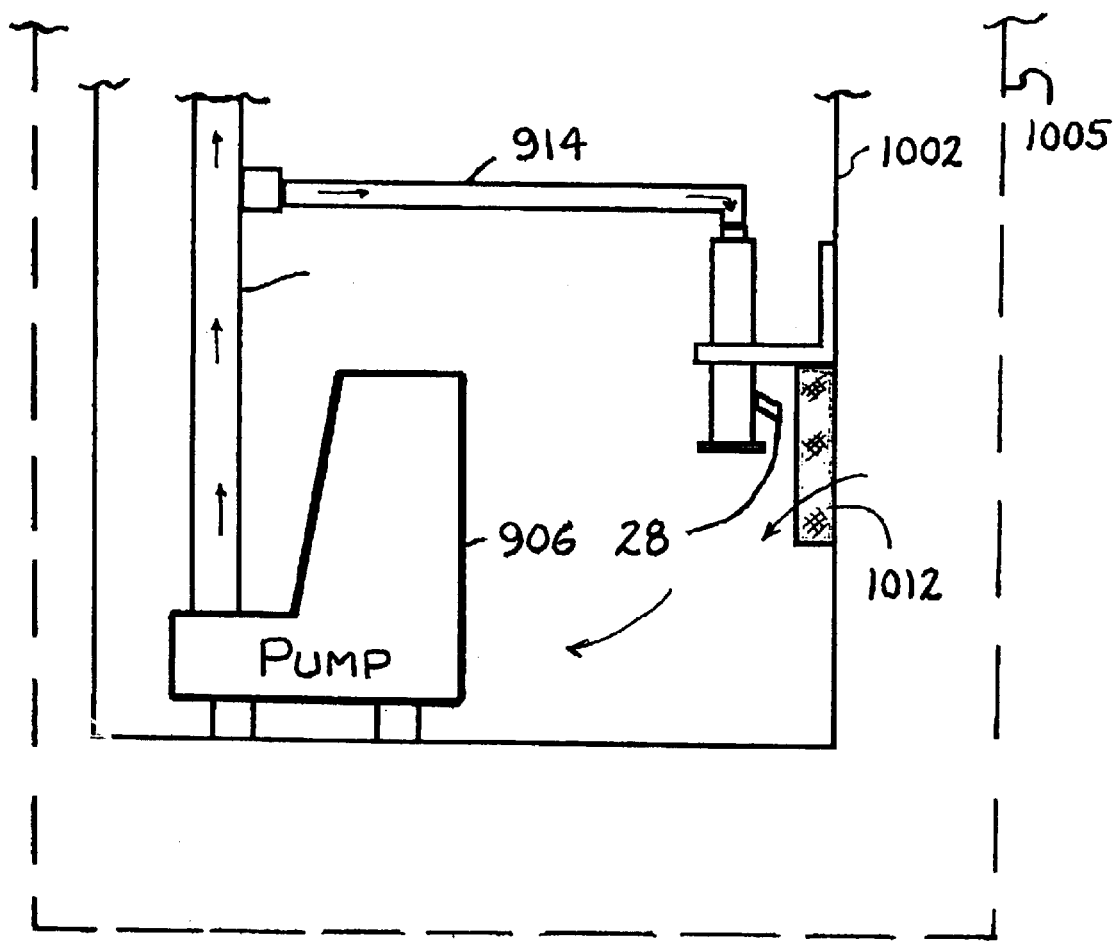
FIG. 11 is a vertical cross section view through still another embodiment.

FIG. 11 shows an embodiment similar to FIG. 10 except that the screen mounts directly in the side wall of vault 1002 at a level above the bottom wall of the vault. This allows the vault to be mounted on the bottom wall of the septic tank. The screen covers a hole in the vault wall.

In embodiments where a pump/strainer unit is disposed directly in a septic tank, without a pump vault, a float switch tree, like tree 111 in FIG. 8A, may be associated with the pump/strainer unit to operate the pump motor so that the intermediate zone of liquid in the tank is maintained at the level of the mesh strainer screen. In embodiments using a pump vault that has openings 508 near the top of the pump vault, opening that are above the self-cleaning strainer, a switch tree may be external to the pump vault, to keep the intermediate zone in the tank at the same level as openings 508 so that liquid that enters the pump vault from the tank through openings 508 will come from the intermediate zone of liquid in the tank.

In any of the embodiments shown using a spray nozzle 28, a different type of nozzle may be substituted, with the screen shape possibly being modified to accommodate the different nozzle. For example, the rotary spray arm shown in FIGS. 2–4 may be substituted, in which case, the screen may not extend around the full circumferential extent of the strainer. In any embodiment the spray must have sufficient strength to dislodge debris from the screen, but at the same time, the spray should not be so strong as to excessively disturb the contents of the tank, especially when the outer face of the screen does not face a wall of a pump vault like it does in FIGS. 5 and 7. Hence, in installations like those of FIGS. 6, 8, 9, 10, and 11, it may be desirable to place a wall of suitable size and shape a short distance from the outer face of the screen, in the same way that wall 346 is associated with the screen in FIG. 3. While the invention may be practiced in various embodiments, such as those specifically illustrated, the inventive principles also contemplate uses where a self-cleaning strainer is installed in a septic system that is already in use, i.e. retrofitting of an existing septic system. Certain embodiments that have been illustrated and described are especially suited for existing septic tank pumps and vaults.

While a presently preferred embodiment of the invention has been illustrated and described, it should be appreciated that principles of the invention are applicable to other embodiments within the scope of the following claims.

What is claimed is:

1. A septic tank and system for pumping liquid from the septic tank as effluent to a drain field comprising:
   a pump for drawing liquid from the septic tank and pumping the liquid as effluent to the drain field;
   a strainer for straining certain particulate matter from the liquid before the liquid enters the pump;
   the strainer comprising a straining screen through which the pump draws the liquid for limiting the size of particulate matter that can pass to the pump;
   at least one nozzle that receives some of the effluent being pumped by the pump and that is aimed toward the screen for directing effluent toward the screen to dislodge particulate matter from an area of the screen while the pump draws liquid through the screen;
   wherein the screen and nozzle are arranged for relative movement so that the area of the screen being acted on by the effluent from the nozzle changes as the pump operates.

2. A septic tank and system as set forth in claim 1 including a pump vault disposed within the tank, and wherein the pump is disposed within the vault.

3. A septic tank and system as set forth in claim 2 wherein the vault comprises a wall having an opening through which liquid in the septic tank enters the vault.

4. A septic tank and system as set forth in claim 3 wherein the vault comprises a closed bottom wall and a cylindrical side wall extending upright from the bottom wall, the opening comprises a series of holes in the side wall spaced above the bottom wall, and the strainer is disposed within the vault below the level of the series of holes.

5. A septic tank and system as set forth in claim 4 wherein the strainer and the pump are disposed side-by-side within the vault.

6. A septic tank and system as set forth in claim 5 wherein the strainer and the pump comprise respective vertical walled housings that are connected by a horizontal tube through which liquid that has been strained by the strainer passes to the pump.

7. A septic tank and system as set forth in claim 6 wherein the screen is stationarily mounted in the walled housing of the strainer and the nozzle is disposed within the walled housing of the strainer and arranged to move relative to the screen.

8. A septic tank and system as set forth in claim 1 wherein the strainer and the pump are disposed side-by-side within the septic tank, and the screen is spaced vertically above a bottom wall of the tank.

9. A septic tank and system as set forth in claim 8 wherein the strainer and the pump comprise respective vertical walled housings that are connected by a horizontal tube through which liquid that has been strained by the strainer passes to the pump.

10. A septic tank and system as set forth in claim 9 wherein the screen is stationarily mounted in the walled housing of the strainer and the nozzle is disposed within the walled housing of the strainer and arranged to move relative to the screen.

11. A septic tank and system as set forth in claim 9 wherein the horizontal tube is disposed vertically above the screen.

12. A septic tank and system as set forth in claim 9 wherein the horizontal tube is disposed vertically below the screen.

13. A system for use in pumping liquid from a septic tank as effluent to a drain field comprising:
   a pump for drawing liquid from the septic tank and pumping the liquid as effluent to the drain field;
   a strainer for straining certain particulate matter from the liquid before the liquid enters the pump;
   the strainer comprising a straining screen through which the pump draws the liquid;
   at least one nozzle that receives some of the effluent being pumped by the pump and that is aimed toward the screen for directing effluent toward the screen to dislodge particulate matter from an area of the screen while the pump draws liquid through the screen;
   wherein the screen and nozzle are arranged for relative movement so that the area of the screen being acted on by the effluent from the nozzle changes as the pump operates;
   including a pump vault adapted to be disposed within the tank, wherein the pump is disposed within the vault, the vault comprises a wall having an opening through which liquid in the septic tank enters the vault, and
   wherein the vault comprises a closed bottom wall and a cylindrical side wall extending upright from the bottom wall, the opening comprises a series of holes in the side wall spaced above the bottom wall, and the strainer is disposed within the vault below the level of the series of holes.

14. A system for use in pumping liquid from a septic tank as effluent to a drain field comprising:

a pump for drawing liquid from the septic tank and pumping the liquid as effluent to the drain field;

a strainer for straining certain particulate matter from the liquid before the liquid enters the pump;

the strainer comprising a straining screen through which the pump draws the liquid;

at least one nozzle that receives some of the effluent being pumped by the pump and that is aimed toward the screen for directing effluent toward the screen to dislodge particulate matter from an area of the screen while the pump draws liquid through the screen;

wherein the screen and nozzle are arranged for relative movement so that the area of the screen being acted on by the effluent from the nozzle changes as the pump operates;

including a pump vault adapted to be disposed within the tank, wherein the pump is disposed within the vault, the vault comprises a wall having an opening through which liquid in the septic tank enters the vault, and wherein the strainer comprises a walled housing and the screen is stationarily mounted in the walled housing of the strainer and the nozzle is disposed within the walled housing of the strainer and arranged to move relative to the screen.

15. A method for limiting size of particulate matter entering the pumping system of a septic tank comprising:

providing a strainer for placement in septic tank liquid wherein the strainer comprises a straining screen for limiting the size of particulate matter that can pass to the pump and at least one nozzle that are relatively movable for enabling the nozzle to move across the screen and emit effluent to dislodge particulate matter in the liquid from an area of the screen;

connecting the strainer to an inlet of a pump so that the pump is constrained to draw septic tank liquid through the screen, thereby straining the liquid before it enters the pump inlet; and connecting the strainer to an outlet of the pump so that some of the strained liquid is returned to the nozzle to be emitted toward the screen and to impart relative movement to the screen and nozzle.

* * * * *